Aug. 12, 1958 B. W. NICKERSON, JR Re. 24,518
SIDE WALL FOR TIRES
Original Filed April 24, 1951
Fig. 2.
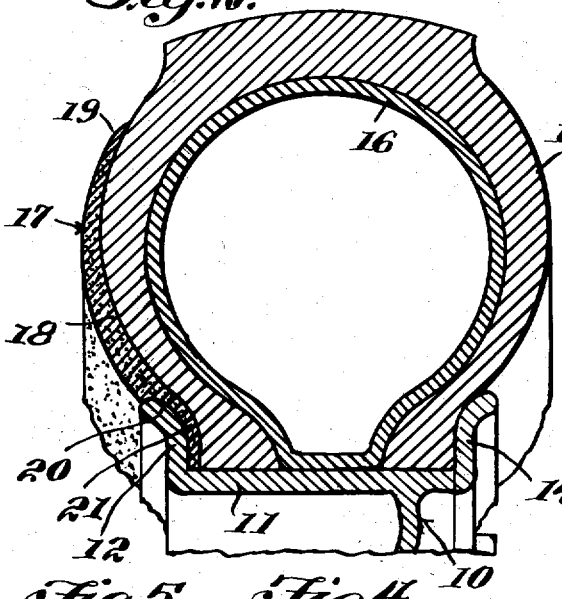
Fig. 3.
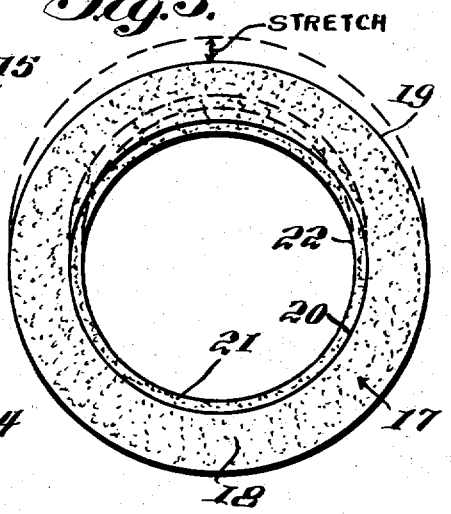
Fig. 5.
Fig. 4.
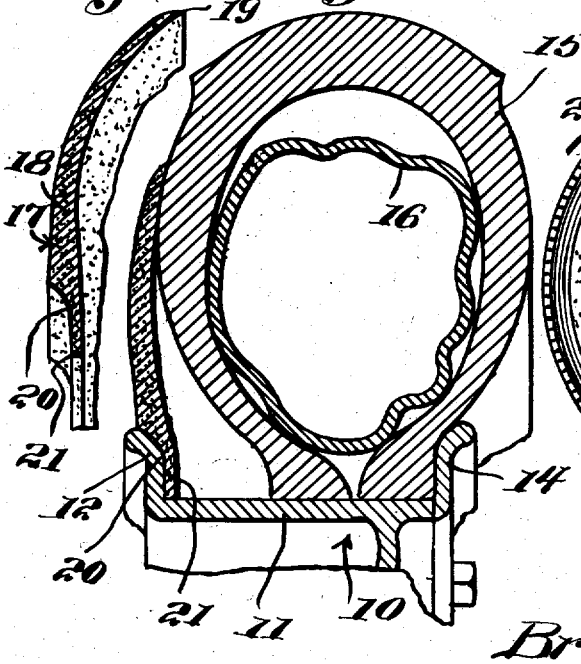
Fig. 1.
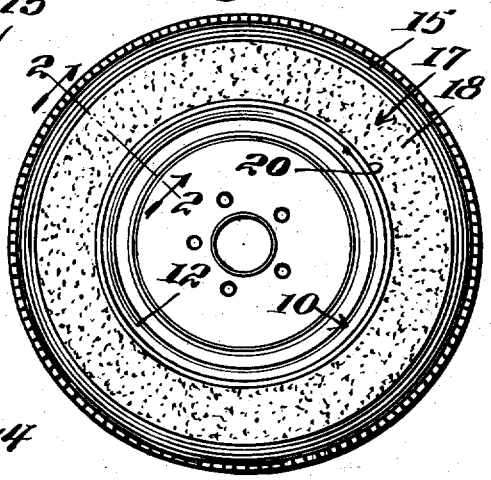
INVENTOR.
Bryan W. Nickerson, Jr.
BY Victor J. Evans & Co.
ATTORNEYS United States Patent Office Re. 24,518
Reissued Aug. 12, 1958

24,518

SIDE WALL FOR TIRES

Bryan W. Nickerson, Jr., Elsmere, Del.

Original No. 2,691,550, dated October 12, 1954, Serial No. 222,583, April 24, 1951. Application for reissue October 1, 1956, Serial No. 613,359

3 Claims. (Cl. 301—37)

Matter enclosed in heavy brackets [ ] appears in the original patent but forms no part of this reissue specification; matter printed in italics indicates the additions made by reissue.

This invention relates to a vehicle tire, and more particularly to an ornamental white side wall for attachment to a vehicle tire.

The object of the invention is to provide a white side wall which is highly ornamental and which can be readily attached to a vehicle tire, such as a pneumatic tire of an automobile.

Another object of the invention is to provide a side wall for attachment to a vehicle tire, the side wall of the present invention being securely anchored between the tire casing and the vehicle wheel rim.

A further object of the invention is to provide a side wall which is extremely simple and inexpensive to manufacture.

Other objects and advantages will be apparent during the course of the following description.

In the accompanying drawings forming a part of this application, in which like numerals are used to designate like parts throughout the same:

Figure 1 is a side elevational view of a tire, with the side wall of the present invention in position thereon;

Figure 2 is an enlarged sectional view taken on the line 2—2 of Figure 1;

Figure 3 is a side elevational view of the side wall of the present invention;

Figure 4 is a view similar to Figure 2, but showing the position of the parts when the tire is deflated, as when the side wall is to be attached;

Figure 5 is a fragmentary sectional view taken through the side wall of the present invention.

Referring in detail to the drawings, the numeral 10 designates a portion of a wheel rim, Figures 2 and 4, and the wheel rim 10 includes the usual web 11 that has projecting therefrom the annular flanges 12 and 14. Mounted on the rim 10 is a tire casing 15 of the pneumatic type, and arranged within the tire casing 15 is a tube 16.

The present invention is directed to an ornamental side wall which is indicated by the numeral 17, and the side wall 17 may be fabricated of any suitable material, such as plastic, and the side wall 17 may have a certain degree of elasticity. The side wall 17 is shaped to define an annular body portion 18, and the side wall 17 is provided with a central recess or opening 22, Figure 3.

The side wall 17 is further shaped so that it includes an outer peripheral edge 19 which has a tendency to curve inwardly, as best seen in Figure 5. The outer edge 19 may be thin or of less thickness than the other part of the body portion 18. The inner portion of the side wall 17 is cut away or recessed, as at 20, and this cutaway portion 20 defines a lip 21. The lip 21 seats between the flange 12 and the adjacent portion of the tire casing 15 so as to securely anchor the side wall 17 in place. Then, when the tube 16 is inflated, the tube 16 and tire casing 15 will assume the positions shown in Figure 2, so that the flexible side wall 17 will snugly embrace or engage the outer surface of the tire casing 15.

In use, the side wall 17 of the present invention can be readily attached to the tire by deflating the tube 16, so that the tube 16 and tire casing 15 assume the positions shown in Figure 4. Then, the side wall 17 can be stretched from the solid line position shown in Figure 3 to the dotted line position of Figure 3, so that the side wall 17 can be slipped over the flange 12. After the side wall 17 has been slipped over the flange 12, it will be in the position shown in Figure 4. Next, the tube 16 is inflated with air in the usual manner, so that the tube 16 and tire casing 15 move from the positions shown in Figure 4 to the positions shown in Figure 2. It will be seen that the lip 21 will be wedged tightly between the flange 12 and the adjacent portion of the tire casing 15. The lip 21 will serve as a medium of transferring the forces caused by the action of the tire bead and the opposite and equal reaction set up by the rim flange. Thus, in serving as a go-between, a pressure is set up between the adjacent surfaces involved to substantially increase the friction so that the lip will resist any force tending to move it laterally from this position. Also, the side wall 17 will be moved so that its shape conforms to the outer configuration of the tire casing 15, and the natural curvature of the outer edge 19 will cause the side wall 17 to snugly engage the tire casing 15. Thus, a highly attractive and ornamental side wall has been provided which can be readily attached to a vehicle tire, such as a pneumatic tire of an automobile.

From the foregoing it is apparent that a side wall has been provided wherein the pressure of the tire when inflated will assist in holding the side wall in place. The side wall of the present invention has a flat body portion 18, Figure 5, with an outer edge 19 that is curved inwardly, and when the tire is inflated, the side wall will assume a shape that will keep it snugly against the tire casing. The cutaway portion 20, and the lip 21 act as a rest or guide which causes the band or side wall to rest at its proper position, and the side wall of the present invention may be of any suitable color such as white. The side wall of the present invention adapts itself to the shape of the tire with which it is being used. The side wall of the present invention requires no alteration of the vehicle wheel rim, and the side wall is securely locked in position by the vice-like grip between the tire and rim flange. The side wall of the present invention is so realistic that it will greatly enhance the attractiveness of the tires of the vehicle, and the side wall can be produced at a relatively low cost and can be made in any desired size. The side wall may be easily applied to the wheel merely by starting at one point and stretching and working the inside edge of the side wall into the rim 10 until you have reached a point, or the point, from which you started. Since the side wall is made of an elastic material, the side wall will not be harmed to any great extent by scraping the curb or when the tire becomes flat. Also, the side wall can be rigidly cleaned with soap and water, and the side wall will snugly fit against the tire casing when the tire casing is inflated. The side wall of the present invention is constructed so that it has a certain amount of stiffness whereby when the tire is inflated the tire causes the side wall attachment to move to the position shown in Figure 2. With the side wall moved out to the position shown in Figure 2, the side wall snugly hugs the tire. Normally the side wall of the present invention has the shape shown in Figure 5, and after it is installed in place and the tire initially expanded by the innertube therein, the side wall 17 moves to the position shown in Figure 4. Finally, with the tube and tire fully expanded or inflated, the side wall 17 occupies the position shown in Figure 2. The side wall of the present invention is made of a rubberlike plastic and is of a sufficient stiffness or resiliency so that it will hug the tire at all times.

During inflation, the sections 18 and 19 will be moved along their longitudinal axes, and the section 18 being flat and being securely anchored along its inside portion, the section 18 will only be able to take the shape of the outer surface of the tire casing. The outer section 19 will embrace and fit perfectly that adjacent portion of the tire casing for which it is shaped and designed. The sections 18 and 19 will remain snugly against the tire after inflation has been completed, because, as shown in the drawings, the side wall has been distorted from its original shape and in striving to retain this shape will exert a force inwardly against the tire. Further, the base of the lip 21 on the outside surface serves as a guide, and the side wall is flat between the lip and outer portion, the outer portion being curved inwardly.

What is claimed is:

1. In combination, a wheel, a rim including annular flanges, a tire mounted on said rim, a unitary ornamental annular side wall provided with a central circular opening, the outer peripheral edge of said side wall being of reduced thickness, there being an annular cutout in said side wall adjacent the inner edge thereof defining a lip for insertion between said tire and one of said rim flanges, said side wall having an intermediate flat portion between the lip and outer portion, said lip including a flat portion and an arcuate portion, said cutout defining a hump providing a vertex for the outer portion of the side wall, said side wall having its greatest thickness at said hump, said side wall being biased outwardly and frictionally embracing the tire when the tire is inflated.

2. The structure as recited in claim 1, wherein said annular side wall is fabricated of a single piece of flexible material, and wherein said side wall is removable from the tire which it embraces.

3. *In combination, a wheel having a rim including annular flanges, a tire mounted on the rim, a unitary ornamental side wall having an annular body portion and a recessed lip portion, said side wall having a central circular opening and a peripheral edge of reduced thickness that is curved inwardly, the body portion having an unstressed cross-sectional shape defining a plane that is axially inwardly of the operating position of said body portion, said lip portion being connected to the inside peripheral edge of the body portion and being arcuately recessed for insertion between the rim flange and adjacent portion of the tire, the body portion and lip portion coacting to cause the side wall to engage the inflated tire, and said side wall being constructed of a single piece of elastic material.*

References Cited in the file of this patent or the original patent

UNITED STATES PATENTS

| | | |
|---|---|---|
| 1,726,026 | Hower | Aug. 27, 1929 |
| 2,088,561 | Bagley et al. | July 27, 1937 |
| 2,334,388 | Daniel | Nov. 16, 1943 |
| 2,573,996 | Spencer | Nov. 6, 1951 |
| 2,621,979 | Barnes | Dec. 16, 1952 |